Jan. 8, 1957 G. T. KODAMA 2,777,110

MINIATURE HIGH DIELECTRIC MULTI-CAPACITOR UNIT

Filed Oct. 7, 1952

GEORGE T. KODAMA, Deceased
*INVENTOR.*
By LLOYD T. KODAMA
ADMINISTRATOR
BY Connolly and Hutz
HIS ATTORNEYS United States Patent Office 2,777,110

Patented Jan. 8, 1957

2,777,110

MINIATURE HIGH DIELECTRIC MULTI-CAPACITOR UNIT

George T. Kodama, deceased, late of Dunstable, Mass., by Lloyd T. Kodama, administrator, Mountain View, Calif., assignor to Sprague Electric Company, North Adams, Mass., a corporation of Massachusetts Application October 7, 1952, Serial No. 313,555

8 Claims. (Cl. 323—74)

This invention relates to improvements in components for electronic circuits and particularly to a multiple capacitor unit for incorporation therein. More specifically this invention relates to a multiple capacitor unit of the general type disclosed in U. S. Letters Patent 2,665,376, issued January 5, 1954, and the present application is a continuation-in-part thereof.

The demand for more compact and less costly electronic devices makes it desirable to combine separate circuit components into a single unit to reduce the space requirements, to minimize the number of connections required in assembling the device and to reduce the possibilities of error in such assembly. However, such combinations of components bring them so close together that serious problems of stray capacitance arise. Where for example two or more sets of capacitor electrodes are provided on a single dielectric member, it is imperative that undesired coupling between different sets of electrodes be reduced if the final product is to be compact.

Another problem which has long confronted the printed circuit field is the fact that even though miniature multi-capacitor units have been successfully constructed and used, the versatility of such units has been limited by the fact that a high dielectric constant ceramic base prevents the use of such dielectric for the many relatively small capacitive values in conventional audio, radio and high frequency circuits because of an inability to accurately stencil, paint or spray the extremely small electrode plates necessary to obtain a low capacitive value. This difficulty is further complicated by the fact that no commercially successful method or means has been as yet devised for securing circuit leads to such minute and ribbon-like electrode plates.

Among the objects of the present invention is the provision of a very simple and inexpensive electronic circuit component in which a plurality of capacitors are combined into a single unit in such manner as to avoid undesired capacitive intercoupling.

Another object of the invention is to provide an electronic circuit component in which a single piece of dielectric is employed to serve as a support for conductive coatings forming capacitor plates and for other conductive coatings so arranged on the dielectric and so shaped as to prevent or obtain capacitance intercoupling between the plates of selected ones of the several capacitors.

The above as well as other objects of the present invention will be more clearly understood from the following description of an exemplification thereof.

According to the present invention a highly practical, simple and inexpensive multi-capacitor unit is provided as a high dielectric constant dielectric disc carrying a plurality of electrodes, two of said electrodes being on directly opposed surface portions of the disc, and the remaining electrodes being all on one face of the disc and spaced from the other two, one of said remaining electrodes being located in shielding arrangement between the two electrodes on one hand and the other remaining electrodes on the other hand and also in shielding relation between the individual other remaining electrodes. Dielectric discs having dielectric constants of at least about 1000 are preferred to keep the physical size of the unit small. Such dielectric constants are available with the titanate ceramics, as for example those described in U. S. Patent No. 2,563,307. The electrodes are applied in any convenient manner as by painting by spraying a coating of metal on the disc, by stencilling, screening or dipping with a composition including a metal or reducible metal compound and treating the composition to render it suitably conductive, or by any other suitable method such as those described in the National Bureau of Standards Circular No. 468 issued November 15, 1947.

It has been discovered that multiple capacitance units are much stronger and less susceptible to breaking, chipping and cracking, etc., during manufacture, handling, installation and stocking if the dielectric is made as a round disc. Further, the use of the circular disc configuration permits a substantial reduction in physical size of the unit. In fact the production cost of the above units are approximately 20% under that necessary to produce an equivalent rectangular unit.

A specific example of the present invention is illustrated in the accompanying drawings in which.

Figure 1:
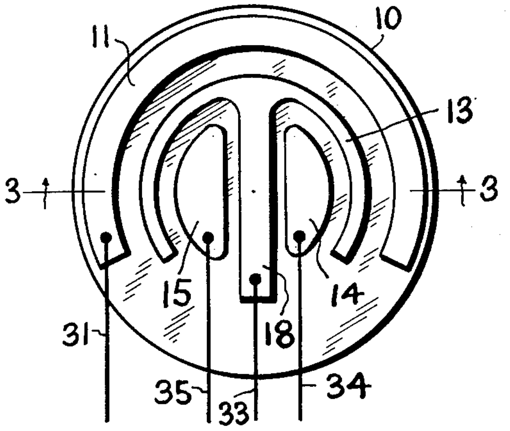
Fig. 1 is a plan view of one side of a multi-capacitor circuit component according to the present invention.
Figure 2:
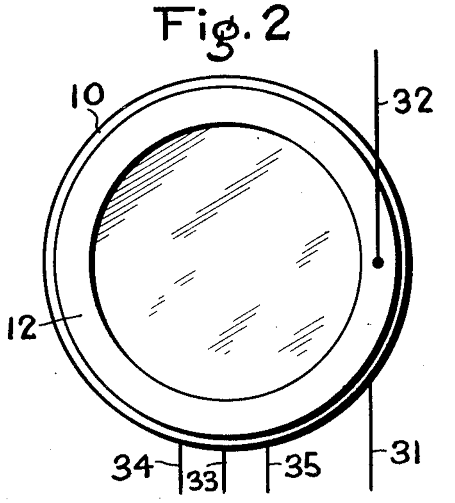
Fig. 2 is a plan view of the opposite side of the circuit component of Fig. 1.
Figure 3:
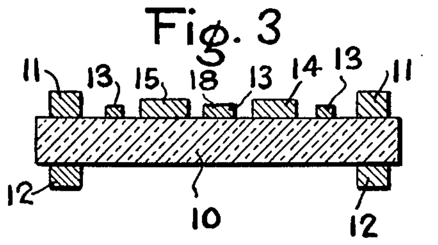
Fig. 3 is a sectional view on the plane of line 3—3 of Fig. 1.

Reference will now be made to Figs. 1 to 3 inclusive of the drawings in describing the specific example of the invention therein illustrated. In these drawings, 10 represents a thin dielectric disc of titanate ceramic.

A plurality of conductive coatings are positioned on the sides of the dielectric to provide a plurality of capacitors with the support member 10 forming a common dielectric, and with the conductive coatings forming their electrodes. As specifically illustrated in Fig. 1, one conductive coating 11 is positioned to extend along an arcuate path over a considerable portion but not all of its periphery. A second arcuate coating 12 is positioned directly opposite coating 11 but extending around the entire disc periphery. In the central portion of one face of the disc three additional electrodes 13, 14 and 15 are applied. Electrode 13 is closest to and generally concentric with electrode 11 and includes an integrally connected intermediate leg 18. Electrodes 14 and 15 are positioned one each in the bay-like areas between the leg and arms of electrode 13 whereby they are substantially encompassed and enclosed by that electrode. These coatings 14 and 15 are close enough to the adjacent arms of coating 13, as well as with the intermediate leg thereof, to produce a definite useful edge-effect capacitance between them. As will be apparent from an inspection of Fig. 1, the value of this capacitance may be varied at will by simply adjusting said coatings 14 and 15, either closer to or more remote from the arcuate arms and/or the leg member of the T-shaped coating 13, or by increasing the lengths of their opposed edges. Although the configuration of these coatings is indicated as being essentially arcuate or segmental, they may be varied in shape in any desired manner.

A plurality of electrical leads 31, 32, 33, 34 and 35 are joined with the respective coatings by any conventional means as by soldering, etc., and extend therefrom in parallel alignment. This construction makes it possible to use relatively short stiff lead members whereby, when installing the multi-capacitor unit, such may form the sole support thereof in either an upstanding or depending position.

Utilization of the interelectrode capacitance between the electrodes 13, 14 and 15 to provide a useful result completely obviates one of the major contemporary problems in the printed circuit field by presenting substantial electrode surface areas for all components, whereby conventional lead affixing jigs may be used to solder the leads 33, 34 and 35 to the respective conductive coatings. The reduction in manufacturing cost attained by this innovation is more than significant.

A circular coating 12 is positioned on the opposite or back side of the dielectric 10 (as shown in Fig. 2) and oriented to oppose the arcuate coating 11, thereby forming a capacitive coupling therewith through the dielectric 10. In practice, the coating 12 is always formed as a complete circle regardless of the value of capacitance desired to be produced between it and the coating 11. This practice reduces the production cost by eliminating the need for notching or otherwise defacing the dielectric 10 in order to insure coextensiveness with the coating 11. Any portions of the coating 12 which do not match portions of the coating 11 are ineffective but the cost of such coating is negligible as compared to the care and tooling necessary to eliminate the ineffective portion.

By locating a single arcuate coating (12) adjacent the periphery on the back side of the round disc dielectric it has been possible to eliminate the need for any second shield on such side even though the dielectric may be as small as 0.02 inch thick. The location of electrode 12 places it radially outward of the single shield coating 13 (see Fig. 3) and any tendency towards establishment of a flux linkage between electrode 12 and electrodes 14 or 15 will be effectively discouraged by the grounded shield coating 13 which is in a position to divert such flux path to prevent its establishing a capacitive coupling linkage.

Further, use of the complete circular coating as a base parameter renders the mass production of the unit much more inexpensive and simple in that the cooperative electrode 11 can be changed in size at will, whereby a wide range of capacitive values may be obtained through the single and simple expedient of lengthening or shortening one coating. This permits the manufacture of the basic unit (comprising the dielectric 10 and coating 12) in large volumes in a single production stage, at a much reduced cost, for subsequent conversion in another stage into various valued capacitors through adjustment of the size of coating 11.

An electrical lead 32 is connected to the coating 12 by any conventional means such as soldering, etc., and is positioned to extend in the opposite direction from the leads 33, 34, 35 on the other side of the dielectric in order to minimize undesirable stray capacitive coupling between them.

If desired, the entire component may be coated with a protecting material such as thermosetting plastic as disclosed in said parent application.

It will thus be seen that the new circuit component includes a first capacitor formed by conductive coatings 11 and 12, a second capacitor formed by conductive coating 14 and a portion of the T-shaped coating 13, and a third capacitor formed by the coating 15 and a second portion of the T-shaped coating 13. This innovation makes it possible to provide three separate capacitances of different values on a single miniature dielectric while at the same time requiring only five leads and a shield on only one face.

Figure 4:
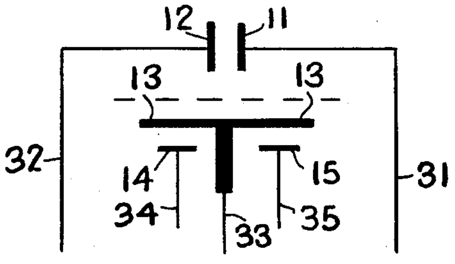
Fig. 4 is a diagram illustrating the connections of the several capacitors and the shielding of some of the capacitors from others.

As will be apparent from an inspection of the diagram shown in Fig. 4, the large valued capacitor 11—12 is completely isolated from the two smaller valued capacitors 14—13 and 15—13 by reason of the centrally positioned T-shaped coating 13.

Figure 5:
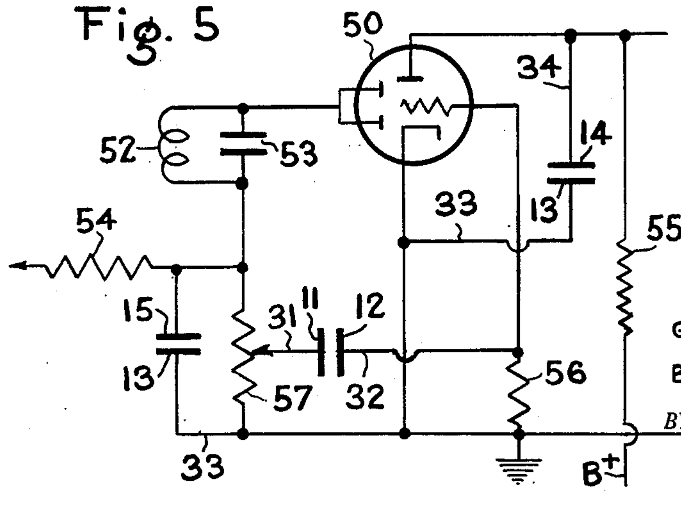
Fig. 5 is a circuit diagram for a typical portion of a radio receiver circuit and showing the application of the capacitor unit of the present invention therein.

Fig. 5 shows the application of the new component to a portion of a typical A. C.-D. C. operated radio receiver. As illustrated, the circuit includes a duodiode triode tube 50, having a transformer winding 52 bridged by a separate capacitor 53 and connected in series with variable resistor 57 in the plate circuit of the diode section thereof. Other fixed resistances 54, 55 and 56 are provided, the resistor 54 constituting a ripple smoothing impedance for supplying carrier level voltages for automatic gain control purposes, the resistor 55 constituting the output load resistor of the triode section, and the resistor 56 constituting the grid return and bias developing member for the triode section. As shown, the diodes of the tube are connected as rectifiers for demodulating the modulated radio signals developed across winding 52 by an input circuit (not shown). The resistor 57 acts as the output load for the demodulated signals and by virtue of a variable potentiometer tap on the resistor, supplies through a coupling capacitor any desired portion of the rectifier output to the triode section of the tube 50 operating as an amplification stage. The output of this amplification stage can be coupled to the input of a second stage (not illustrated) which may be a power amplification stage, as is conventional in practice. The general circuit is well known and need not be further described.

From an inspection of Fig. 5, it will be noted that capacitor 15—13 provides carrier frequency filtering for the demodulated signals from the rectifier portion of tube 50, the capacitor 11—12 couples the potentiometer tap to the triode amplifier to supply the desired portion of the demodulated signal developed over resistor 57 to the triode amplification section of tube 50, and the capacitor 14—13 is connected across the output of the triode amplifier stage as an additional filter. Thus, the integral multiple capacitor unit of the instant invention supplied all of the necessary capacitances for the demodulating and first amplification stages of the set with the sole exception of the capacitor 53 which is generally constructed separately so as to properly resonate with the windings 52.

Although Fig. 5 shows the coating 11 connected to potentiometer 57, and the coating 12 connected to the input of the triode section of tube 50, the connections can be interchanged if desired. This interchange is particularly useful since it simplifies the inclusion of a resistance coating in the unit to thereby eliminate the need for an external resistor 56. Thus, by merely painting a resistive stripe between coatings 11 and 13 on one face of the unit, and controlling this stripe so that it has a resistance corresponding to that desired for the resistance 56, the stripe will take the place of this resistance. Other external resistors can be correspondingly incorporated.

As another variation of the present invention, the unit can be modified so as to also include the capacitance 53. This is very helpful when the transformer winding 52 is of the untuned type, or is tuned by varying its inductance, using a fixed capacitance 53. This additional capacitance is readily provided as by edge effect coupling of an additional separate coating alongside coating 15 in the gap provided between the adjacent ends of coating 13. Alternatively, the extra capacitance can have its electrodes on opposite sides of the dielectric disc, as by providing a small additional coating on the opposite face of disc 10 directly opposing the portion of electrode 15. The additional coating can be much smaller than coating 15 and spaced as far as possible from coating 12. The smaller size is possible because the capacitance contributed by having disc 10 between coatings on opposed portions of its faces is considerably higher than is available from edge effect coupling between coatings that are on the same face. The remote spacing of the additional electrode from electrode 12 helps to reduce undesirable coupling. The absence of coupling between capacitor 53 and electrodes 11 and 12 is not quite so critical and a small amount of stray coupling can be tolerated.

The lead 32, although shown as extending in a direction opposite to the other leads, can be relocated into any other desired position. By way of example, it could be arranged on one side of the central group of leads 33, 34, 35 so as to be symmetrical with the way lead 31 is associated with them.

As another alternative the combination of the present invention can also be used with circuits having a pentode or tetrode amplification stage in place of the triode stage shown in Fig. 5. The additional screen by-pass capacitance used with such pentode or tetrode stages can be provided either as an extra coating in the unit of the present invention, or as a separately connected capacitance.

A feature of the present invention is the fact that only one shield coating is needed to effect all the necessary shielding. Complete shielding can apparently not be obtained in this manner unless one face of the dielectric is completely free of electrode coatings in an area which is on one side of the shield.

As many apparently widely different embodiments of this invention may be made without departing from the spirit and scope hereof, it is to be understood that the above invention is not limited except as defined in the appended claims.

What is claimed is:

1. A multi-capacitor unit having a high dielectric constant dielectric disc carrying a plurality of electrodes, two of said electrodes being on directly opposed surface portions of the disc, and the remaining electrodes being all on one face of the disc and spaced from the other two, one of said remaining electrodes being located in shielding arrangement between the two electrodes on one hand and the other remaining electrodes on the other hand, and also in shielding relation between the individual other remaining electrodes.

2. A multi-capacitor unit having a high dielectric constant dielectric disc carrying a plurality of electrodes, two of said electrodes being on directly opposed marginal surface portions of the disc, and the remaining electrodes being all on one face of the disc's central portion and spaced from the other two, one of said remaining electrodes being located in shielding arrangement between the two electrodes on one hand and the other remaining electrodes on the other hand and also in shielding relation between the individual other remaining electrodes, said other remaining electrodes being closely adjacent said one remaining electrode to provide edge-effect capacitance therewith.

3. A miniature multi-capacitor circuit component comprising, a ceramic base having a dielectric constant of at least 1000, a pair of conductive coatings positioned on opposite faces of said base and cooperating through said base dielectric to produce a relatively high capacitive value, and at least two other conductive coatings positioned on one of said faces in spaced relationship to each other and to the adjacent one of said first pair of conductive coatings, said other conductive coatings cooperating together to provide a useful interelectrode capacitance of a relatively low value.

4. The combination set forth in claim 3 in which one of said two other coatings is a shield coating between the first pair of coatings and the other coatings.

5. A miniature multi-capacitor circuit component comprising a ceramic base having a dielectric constant of at least 1000, a pair of conductive coatings positioned on opposite faces of said base and cooperating through said base dielectric to produce a relatively high capacitive value, and at least two other conductive coatings positioned on one of said faces in spaced relationship to each other and to the adjacent one of said first pair of conductive coatings, one of said other coatings substantially surrounding another of said other coatings and shielding it against capacitive coupling with said pair of coatings.

6. A miniature network component comprising a disc of high dielectric constant material, a plurality of conductive coatings on the surfaces of said disc, at least two of said coatings being disposed on opposite sides of said disc in axial alignment to provide a relatively large capacitance therebetween, one of said plurality of conductive coatings having a physical configuration including a substantially U-shaped portion and being interposed between the remaining plurality of conductive coatings and one of the said two conductive coatings on one side of said disc and including terminal means for connecting said coating to a reference potential for operation as a shield, and a resistive coating interconnecting at least two of said plurality of conductive coatings.

7. A miniature network component comprising a disc of high dielectric constant material, a plurality of conductive coatings on the surfaces of said disc, at least two of said coatings being disposed on opposite sides on said disc in axial alignment to provide a relatively large capacitance therebetween, one of said plurality of conductive coatings having a physical configuration including a substantially U-shaped portion and being interposed between the remaining plurality of conductive coatings and one of the said two conductive coatings on one side of said disc and including terminal means for connecting said coating to a reference potential for operation as a shield, one of said two coaxially aligned coatings comprising an annulus.

8. A multi-capacitor unit having a high dielectric constant disc carrying electrodes, two of said electrodes being on directly opposed surface portions of said disc, others of said electrodes being on one face of said disc and spaced from said other two directly opposed electrodes, and one of said other electrodes being disposed between said two opposed electrodes and the remaining of said other electrodes in shielding arrangement.

References Cited in the file of this patent

UNITED STATES PATENTS

| | | |
|---|---|---|
| 2,399,082 | Wainer | Apr. 23, 1946 |
| 2,474,988 | Sargrove | July 5, 1949 |
| 2,566,666 | Khouri | Sept. 4, 1951 |
| 2,634,330 | Gaudio | Apr. 7, 1953 |

FOREIGN PATENTS

| | | |
|---|---|---|
| 502,532 | Great Britain | Mar. 20, 1939 |